W. F. OSBORN.

Wheel Harrow.

No. 83,878.

Patented Nov. 10, 1868.

Witnesses:
Joe A Peylor
Baltus De Long

Inventor:
W. F. Osborn
By his atty Wm D Baldwin

WILLIAM F. OSBORN, OF MOUNT PLEASANT, PENNSYLVANIA.

Letters Patent No. 83,878, dated November 10, 1868.

IMPROVEMENT IN HARROWS.

The Schedule referred to in these Letters Patent and making part of the same.

*To all whom it may concern:*

Be it known that I, WILLIAM F. OSBORN, of Mount Pleasant, in the county of Westmoreland, and State of Pennsylvania, have invented certain new and useful Improvements in Harrows, of which the following is a full, clear, and exact description.

The objects of my invention are to cause a harrow to run lightly in working, to guide it easily, and to transport it from field to field without dragging the teeth; to which ends the improvements herein claimed consist—

First, in a novel method of combining a harrow with a supporting-carriage and devices for lifting the harrow.

Second, in a novel method of combining a hinged harrow, suspended from a carriage, with lifting-levers, which interlock to hold the harrow up when lifted.

Third, in a novel method of combining a centrally-hinged harrow with a supporting-carriage, upon which it may be folded for transportation.

Fourth, in a novel method of combining a harrow and a supporting-carriage with a tongue, pivoted to play laterally, to turn the machine more easily, and yet is ordinarily held rigidly, to guide the machine.

In the accompanying drawings, which make part of this specification, and which exemplify one convenient way of carrying out the objects of my invention—

A stout frame, A, is mounted on two wheels, B B', and supports a seat, C, for the driver.

The tongue, D, turns horizontally on a pivot, $d$, when released from its catch, consisting of a pin, E, vibrating on a horizontal pivot, and having a spring, $e$, acting on its upper end to hold it in a notch in the back end of the tongue. The driver can release the tongue to turn the machine by pressing forward the upper part of the pin E with his foot, and the spring locks it automatically when the tongue is brought into the proper position.

The frame of the harrow is formed in two wings or sections, F F', is divided longitudinally and centrally, and these sections are united by hinges, $f f^1$, projecting above the harrow, so as to cause the sections to separate and lift, as the hinges open to allow them to clear the frame more readily. The wheels, it will be observed, straddle the central timbers of the harrow-frame, which frame is suspended by a chain, $f^2$, directly from the pivot of the tongue.

Chains, $h$, are attached to the outer sides of the harrow-frame, and to cranks on the ends of bent lifting-levers, H H', arranged longitudinally on the frame, and rocking in proper bearings.

The handle $h'$ of the lever H is slotted, so that the handle of the other one, H', may pass through this slot.

Figure 1:
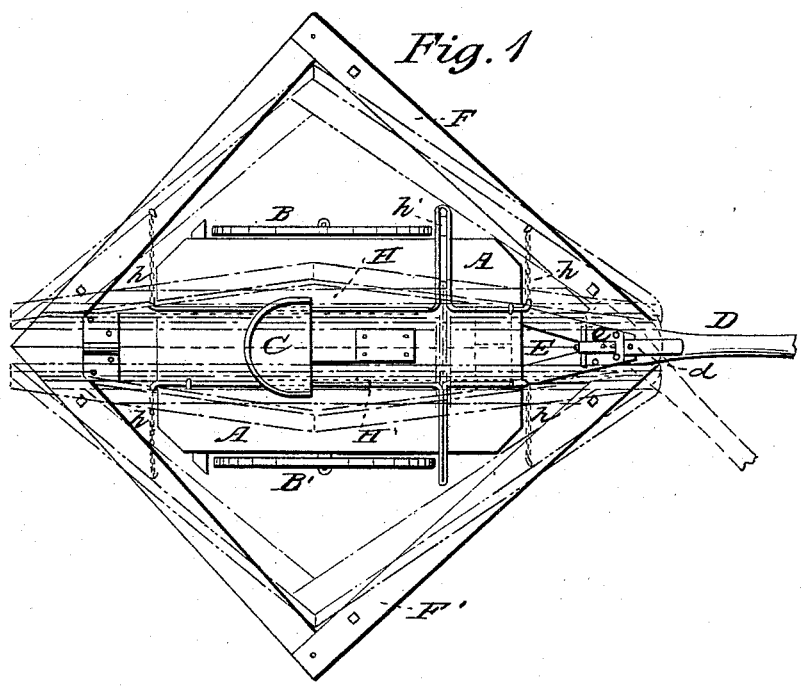
Figure 1 represents a plan or top view of the machine, the black lines showing the attitude assumed by the several parts when harrowing; the red lines, the position of the harrow when raised temporarily to pass obstructions; and the blue lines, the position when arranged for transportation. The dotted lines show the way in which the tongue turns on its pivot when its catch is released.
Figure 2:
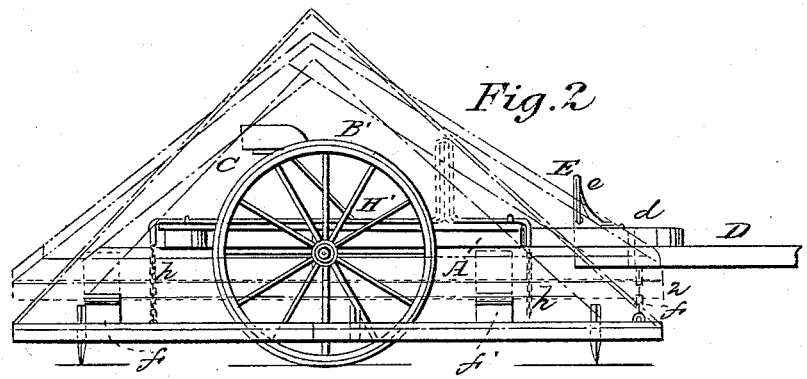
Figure 2 represents a view in elevation of the machine as seen from one side, the same colors representing positions corresponding to those shown in similar colors in fig. 1.

When the harrow is raised, as shown in red lines, the lever-handles interlock and hold the harrow-teeth slightly above the ground. By unfastening the catch E, and allowing the tongue to swing round, as shown in fig. 1, the team can pull directly on the harrow, and thus turn much more readily than by merely pressing sidewise on the tongue, as they would do if the tongue remained stiff.

To transport the harrow from field to field, the sections are turned up until they rest on the frame A, where they may be held by their own weight, or by a hook or pin on the frame. In the present instance, the sections are raised partly by the levers and partly by the hand of the driver, but it is obvious that the parts might be so arranged that they could be turned upon the frame entirely by the lifting-levers.

By my invention, I am enabled to graduate the depth of the harrowing by raising or lowering the harrow-frames, to turn the machine readily, to lift the teeth to pass obstructions, to fold the harrow upon the carriage when desired, and to place the machine completely under the control of the driver while riding on the machine.

What I claim as my invention, and desire to secure by Letters Patent, is—

1. The combination, substantially as set forth, with a harrow, of a supporting-carriage, enclosed within the harrow, and carrying devices for lifting the harrow at the will of the driver.

2. The combination, substantially as set forth, with a supporting-carriage and hinged harrow-frame, of the interlocking lifting-levers, for the purpose specified.

3. The combination, as set forth, with the supporting wheeled carriage carrying a seat for the driver, of the centrally-hinged sectional harrow-frame, arranged to fold upon the carriage for transportation, without interfering with the driver.

4. The combination, substantially as set forth, with the supporting-carriage, of the pivoted tongue and locking-catch, for the purpose specified.

In testimony whereof, I have hereunto subscribed my name.

W. F. OSBORN.

Witnesses:
MARTIN N. STAUFFER,
THOMAS A. BAIR.